No. 755,223. PATENTED MAR. 22, 1904.
W. B. FENN.
SECTIONAL MOLDED VESSEL.
APPLICATION FILED DEC. 23, 1902.
NO MODEL. 2 SHEETS—SHEET 1.
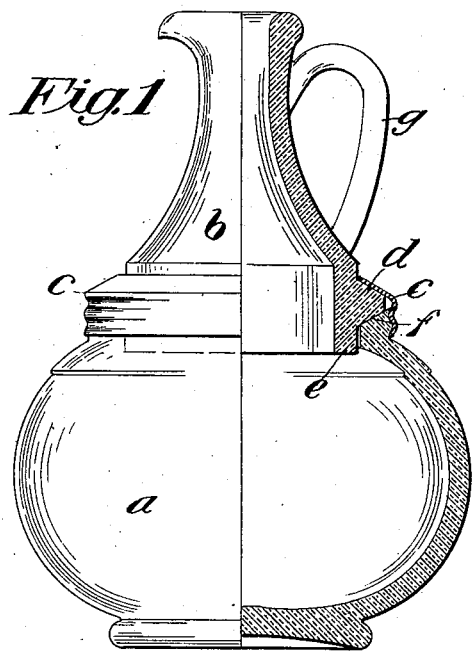
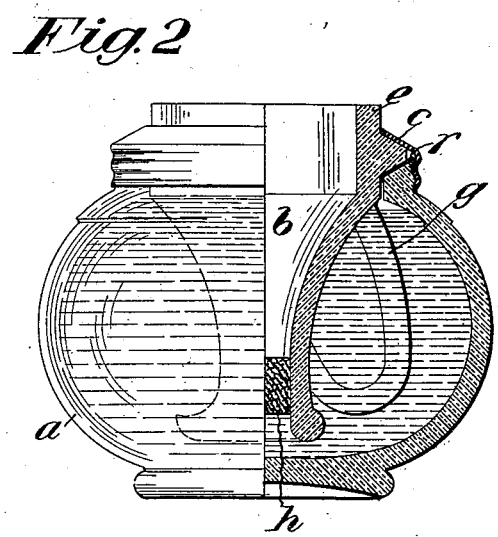
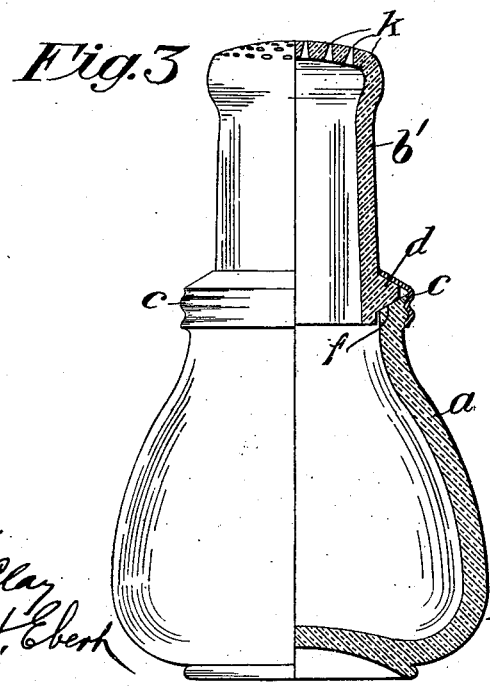
Witness:
F. W. H. Clay
Chas. H. Eberh
Inventor:
William B. Fenn
By Paul Synnestvedt
Attorney.

No. 755,223. PATENTED MAR. 22, 1904.
W. B. FENN.
SECTIONAL MOLDED VESSEL.
APPLICATION FILED DEC. 23, 1902.
NO MODEL. 2 SHEETS—SHEET 2.
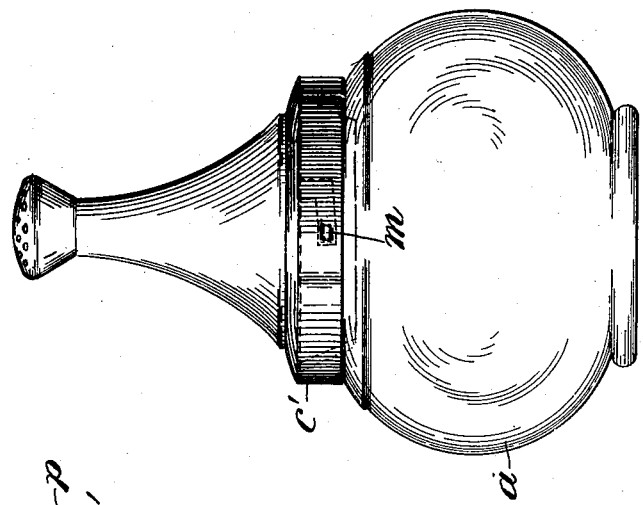
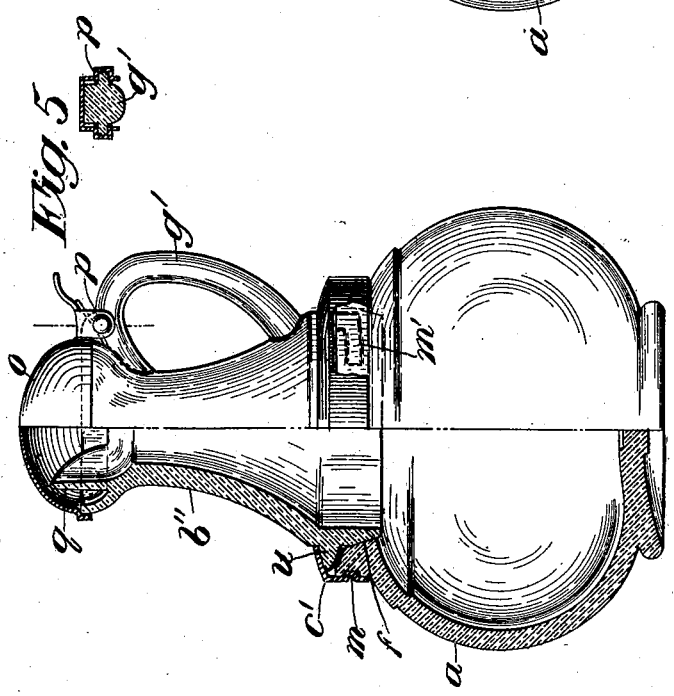
Witness:
F. W. H. Clay
Chas. H. Ebert
Inventor:
William B. Fenn
by atty
Paul Synnestvedt No. 755,223. Patented March 22, 1904.

UNITED STATES PATENT OFFICE.

WILLIAM B. FENN, OF WASHINGTON, PENNSYLVANIA.

SECTIONAL MOLDED VESSEL.

SPECIFICATION forming part of Letters Patent No. 755,223, dated March 22, 1904.

Application filed December 23, 1902. Serial No. 136,414. (No model.)

*To all whom it may concern:*

Be it known that I, WILLIAM B. FENN, a citizen of the United States of America, residing at Washington, in the county of Washington and State of Pennsylvania, have invented certain new and useful Improvements in Sectional Molded Vessels, of which the following is a specification.

My invention is applicable to all kinds of vessels made by molding or blowing and particularly to vessels which for one reason or another are preferably made in parts to be joined together. Among the objects of my invention are the following: first, to provide a vessel having a small orifice or orifices in the head thereof, which head may be made integral with the neck; second, to provide means by which one part of a vessel may be packed inside of the other part for convenient and safe transportation; third, to provide means by which vessels having small openings may be thoroughly cleaned from the inside. Other objects of my invention are to provide special means for joining the sections of a two part vessel in such a way as to dispense with rubber or other soft packing, and to provide superior means for attaching the two parts of a sectional vessel. The invention also consists in various improvements in the construction of the parts and the mode of handling and assembling the same.

These objects, as well as other advantages which will hereinafter appear, I attain by means which I have illustrated as preferably applied to the manufacture of glassware in the accompanying drawings forming part of this specification, in which—

Figure 1 is a side view in partial section of a glass vessel provided with my improved joint and designed to be used for the purposes above set forth.

Figure 2 is a side view and half section of the same with the upper part of the vessel inverted and the two parts fitted together and containing a liquid for transportation.

Figure 3 is a side elevation and half section of another form of vessel such as a salt or pepper box made according to my invention.

Figure 4 is a side view and half section of a convenient form of syrup jug, and showing a bayonet fastening instead of the screw fastening of the other figures.

Figure 5 is a partial section showing a novel mode of attaching the metallic cap to the said syrup jug.

Figure 6 is a side elevation of a form of sprinkling bottle for liquids, the two parts being joined by a ring with a bayonet joint.

It is well known that in all vessels in which the opening or mouth thereof is smaller than the body of the vessel great difficulty is experienced in cleaning the same. It is also well known to manufacturers that one of the chief sources of loss in such vessels is the breakage in transit in freight. Also in the manufacture of vessels having a very small orifice for the outlet of the material contained in them there is great difficulty in making the head part of the vessel with the openings in parts to fit together; so much so that it is common practice to make vessels such as salt cellars, pepper boxes and vessels requiring a squirt orifice only partially of glass or other molded material and to provide a separate head made entirely of metal. There are various disadvantages of this, such as the corrosion caused by the salt or by acids in the vessels.

To overcome these difficulties and many others I have designed in general that the vessels shall be made of two parts to be joined together generally upon a ground surface and making one part of the vessel of a size and design to fit inside of the other in packing for transportation, as shown for example in Figure 2.

$a$ is the body of the vessel, $b$ the upper part carrying the neck integral therewith. The upper part has a depending flange $e$ which is of a size to fit inside of the lower part or body $a$ and rests upon the top of the body portion on the conical ground surface $f$ on the annular flange $d$, preferably ground on both sides. The upper part is held securely in place upon the body by means of a ring $c$ which may be of metal, and which is slipped over the upper part of the vessel and rests upon the flange $d$ and is secured to the body of the vessel by means of screw threads or bayonet joint, or any other preferred means of locking the two parts together.

When it is desired to pack such a vessel for transportation the ring $c$ is unscrewed, the upper part inverted in position and the ring $c$ screwed back to place again, the two sides of the annular flange $c$ being essentially the same shape. In case it is desired to pack liquid in the vessel at the same time this may be done by providing a stopper $h$ in the mouth of the vessel and preferably using a packing $r$ between the flange $d$ and the ground top of the body portion of the vessel.

In Figure 3 I have shown a salt cellar or pepper box constructed according to this invention, the two parts $a$ and $b'$ being fixed together by means of a screw threaded ring $c$ on the flange $d$ as before, and having in its head the perforations $k$. It may also be made reversible for packing.

In Figure 4 I have shown a novel form of vessel for containing syrup and in this instance beside the body portion $a$ and the neck portion $b''$, a separate annular flange $u$ is provided, which serves merely to take the thrust of the metal ring $c'$ when it is put in place on the bayonet joints $m$, $m'$, the contact surface between the two parts of the vessels being ground at $f$ so that they fit hermetically and do not require a rubber or other soft packing. In this vessel, since it is easy to clean the inside, I have provided a cover of a peculiar form, $o$, and I attach it to the vessel by means of sockets $p$ which fit over studs cast in the vessel handle $g'$ itself as shown in Figure 5. The mouth of the vessel is also provided with a lip $q$ which serves to drain the syrup back into the vessel after use, as will be plain.

In Figure 6 I have shown a glass vessel such as is commonly used upon ladies' toilet tables for spraying perfumes, etc., the head of the bottle being provided with very small perforations and made integral with the neck. This construction is made possible by reason of the jointed section construction. The ring $c'$ to join the two parts and the ground surface, are as shown in Figure 4, using the bayonet joint.

In some cases it may be well to use a packing ring to secure the joint of the two parts of the vessel; but I prefer to make the close contact by grinding the surface either on one side or both sides of the annular ring $d$ (Figure 1), and also the upper surface $f$ of the sloping top of the body portion, thus making a hermetical joint without the requirement of any packing. It will be observed that in such vessels as that shown in Figure 3, for the use of salt, when the two parts are put together there is no metallic element in contact with the contents of the vessel, nor is there any packing required. I regard the feature of designing the two parts so that one may be inverted and placed inside the other as of great importance and I believe I am the first to make a vessel which may be put together in either the upright or inverted position as shown in Figure 2. This mode of packing not only takes up about 50 per cent less space than the ordinary, but what is far more important, it prevents the breaking of the more fragile parts of the vessel.

It will be understood that I am not limited to any particular form of vessel nor to any particular material of which the vessel is made, since it is evident that it might be made of other material than glass, as illustrated. The two-part vessel having a squirt orifice head integral with the neck of the vessel, as illustrated in Figure 6, I do not claim herein, but the same is claimed in my co-pending application No. 136,415, filed 23 December, 1902. I am aware that two-part vessels have been made, in which the one part is screwed to the other and I do not broadly claim such construction; but,

Having thus described my invention and illustrated various uses of it, what I claim as new, and desire to secure by Letters Patent, is the following:

1. A two-part vessel having one part reversible to fit in the other and means for hermetically joining the two parts together in either position.

2. A vessel formed of two parts with contact surfaces making a liquid tight joint between the parts and reversible so that one part may be placed inside the other for packing.

3. A two part vessel provided with a small orificed-head made integral with the neck, the portion bearing the head and neck being invertible to go inside of the body of the vessel and having a liquid tight joint between the two parts.

4. A two-part vessel consisting of a body portion provided with a conical ground seating surface, and a neck portion provided with a depending annular flange to enter the body portion and with a circumferential flange having both sides conical and ground to fit upon the ground seat of the body portion, and a screw-ring to hold the two parts in place, substantially as described.

5. A two-part vessel adapted to have one part thereof inverted and inserted in the other part and means for making a water tight joint between the two parts when in inverted position.

6. A vessel consisting of a body part having a conical ground surface for a joint, a top part having a conical ground surface to fit with the said ground surface of the body part, and a metallic ring with attaching means for fastening the two parts together, either in upright or inverted position.

7. The combination of a body part $a$ provided with a ground surface $f$, an upper portion $b$, provided with an annular rim $d$ having a conical ground surface on both sides thereof, and a metallic ring $c$ adapted to be screwed to the body part and clamp the top part in place by means of rim $d$, substantially as described.

8. A closed two-part vessel consisting of a body portion having a surface dressed for a joint, a neck portion provided with an integral head having capillary openings therein, said neck and head portion being invertible and provided with a flange so as to fit upon the bearing surface of the body in either upright or inverted position, substantially as described.

9. In a two-part vessel having one part invertible, an annular flange on the invertible part designed to make a hermetical joint with the other part either in upright or inverted position.

In testimony whereof I have hereunto signed my name in the presence of the two subscribed witnesses.

WILLIAM B. FENN.

Witnesses:
 JOHN W. McDOWELL,
 JAS. W. McDOWELL.